US012176790B2

(12) United States Patent
Tokizaki et al.

(10) Patent No.: US 12,176,790 B2
(45) Date of Patent: Dec. 24, 2024

(54) BRUSHLESS MOTOR

(71) Applicant: MITSUBA Corporation, Gunma (JP)

(72) Inventors: Teppei Tokizaki, Gunma (JP); Motoaki Kobayashi, Gunma (JP); Satoshi Tamura, Gunma (JP); Masaki Hayata, Gunma (JP); Masakazu Saito, Gunma (JP); Yoshichika Kawashima, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/334,359

(22) Filed: Jun. 13, 2023

(65) Prior Publication Data

US 2024/0072605 A1 Feb. 29, 2024

(30) Foreign Application Priority Data

Aug. 31, 2022 (JP) ................. 2022-137583

(51) Int. Cl.
*H02K 7/116* (2006.01)
*F16H 1/08* (2006.01)
*B60S 1/08* (2006.01)
*B60S 1/26* (2006.01)
*F16H 57/02* (2012.01)

(52) U.S. Cl.
CPC ............ *H02K 7/116* (2013.01); *F16H 1/08* (2013.01); *B60S 1/08* (2013.01); *B60S 1/26* (2013.01); *F16H 2057/02034* (2013.01)

(58) Field of Classification Search
CPC .......... H02K 7/116; H02K 5/15; H02K 1/187; H02K 5/1675; H02K 5/1735; H02K 7/003; H02K 21/22; H02K 29/08; H02K 2211/03; H02K 11/215; F16H 1/08; F16H 2057/02034; B60S 1/08; B60S 1/26; B60S 1/166
See application file for complete search history.

(56) References Cited

U.S. PATENT DOCUMENTS

| | | | | |
|---|---|---|---|---|
| 8,659,251 B2 * | 2/2014 | Amagasa | ............ | H02K 7/1166 |
| | | | | 318/400.38 |
| 10,177,626 B2 * | 1/2019 | Nishidate | ............... | H02K 7/085 |
| 2021/0021174 A1 * | 1/2021 | Kojima | ................ | H02K 5/1735 |

FOREIGN PATENT DOCUMENTS

| | | | | |
|---|---|---|---|---|
| CN | 102801227 A | * | 11/2012 | ............ H02K 21/22 |
| JP | 2010093977 | | 4/2010 | |

OTHER PUBLICATIONS

English Language Translation of CN 102801227 (Year: 2012).*

* cited by examiner

*Primary Examiner* — Victor L MacArthur
(74) *Attorney, Agent, or Firm* — JCIPRNET

(57) ABSTRACT

A brushless motor includes a motor part and a gear part. The motor part includes: a rotating shaft, having a first gear; a rotor, having a bottom wall and a side wall, the bottom wall being fixed to the rotating shaft; magnets, fixed to the side wall and arranged side by side in a circumferential direction of the rotor; a stator, provided between the rotating shaft and the magnets in a radial direction of the rotor and wound with a coil; and a motor housing, rotatably supporting the rotating shaft, and accommodating the rotor and the stator. The gear part includes: a second gear, meshed with the first gear; an output shaft, having an output part, having a base end side thereof fixed to the second gear, and parallel to the rotating shaft; and a gear housing, rotatably supporting the output shaft, and accommodating the second gear.

10 Claims, 7 Drawing Sheets

BRUSHLESS MOTOR

CROSS-REFERENCE TO RELATED APPLICATIONS

This application claims the priority benefit of Japan Application No. 2022-137583, filed on Aug. 31, 2022. The entirety of the above-mentioned patent application is hereby incorporated by reference herein and made a part of this specification.

BACKGROUND

Technical Field

The disclosure relates to a brushless motor including a motor part and a gear part.

Related Art

Conventionally, for a drive source of a wiper device or a power window device or the like mounted on a vehicle such as an automobile, a brushless motor with a speed reduction mechanism capable of outputting large torque despite its small size has been adopted. Such an in-vehicle brushless motor is described in, for example, Japanese Patent Laid-Open No. 2010-093977 (Patent Document 1).

The brushless motor described in Patent Document 1 is a motor with a speed reduction mechanism including a worm speed reducer, in which a worm is provided integrally with a rotating shaft, and an output shaft orthogonal to the rotating shaft is fixed to a worm wheel meshed with the worm. In this way, in the brushless motor described in Patent Document 1, by adopting the worm speed reducer, the rotating shaft and the output shaft are orthogonal to each other.

However, in the technology described in Patent Document 1, since the rotating shaft and the output shaft are orthogonal to each other, the brushless motor has the following shape in appearance, that is, a shape in which a motor part protrudes greatly to a side of a speed reduction part. Accordingly, a problem arises that layout properties with respect to the vehicle deteriorate. Specifically, for example, if the brushless motor is used as a wiper motor, a wiper motor having a left-right symmetric shape is required for each of a right-hand drive vehicle and a left-hand drive vehicle.

SUMMARY

In one aspect of the disclosure, a brushless motor includes a motor part and a gear part. The motor part includes: a rotating shaft, having a first gear provided on a tip side thereof; a rotor, having a bottom wall and a side wall, the bottom wall being fixed to a base end side of the rotating shaft; a plurality of magnets, fixed to the side wall and arranged side by side in a circumferential direction of the rotor; a stator, provided between the rotating shaft and the plurality of magnets in a radial direction of the rotor and wound with a coil; and a motor housing, rotatably supporting the rotating shaft, and accommodating the rotor and the stator. The gear part includes: a second gear, meshed with the first gear; an output shaft, having an output part provided on a tip side thereof, having a base end side thereof fixed to the second gear, and parallel to the rotating shaft; and a gear housing, rotatably supporting the output shaft, and accommodating the second gear.

DESCRIPTION OF THE EMBODIMENTS

The disclosure provides a brushless motor in which layout properties can be improved.

According to the disclosure, since a rotating shaft and an output shaft are parallel to each other, it is possible to arrange a motor housing and a gear housing side by side in an axial direction of the rotating shaft (output shaft). Accordingly, the brushless motor can be given a line-symmetric shape in appearance about a line segment connecting the rotating shaft and the output shaft. Accordingly, attachment directionality can be eliminated on the left and right sides of the line segment connecting the rotating shaft and the output shaft. Thus, it is possible to improve layout properties.

Hereinafter, one embodiment of the disclosure is described in detail with reference to the drawings.

Figure 1:
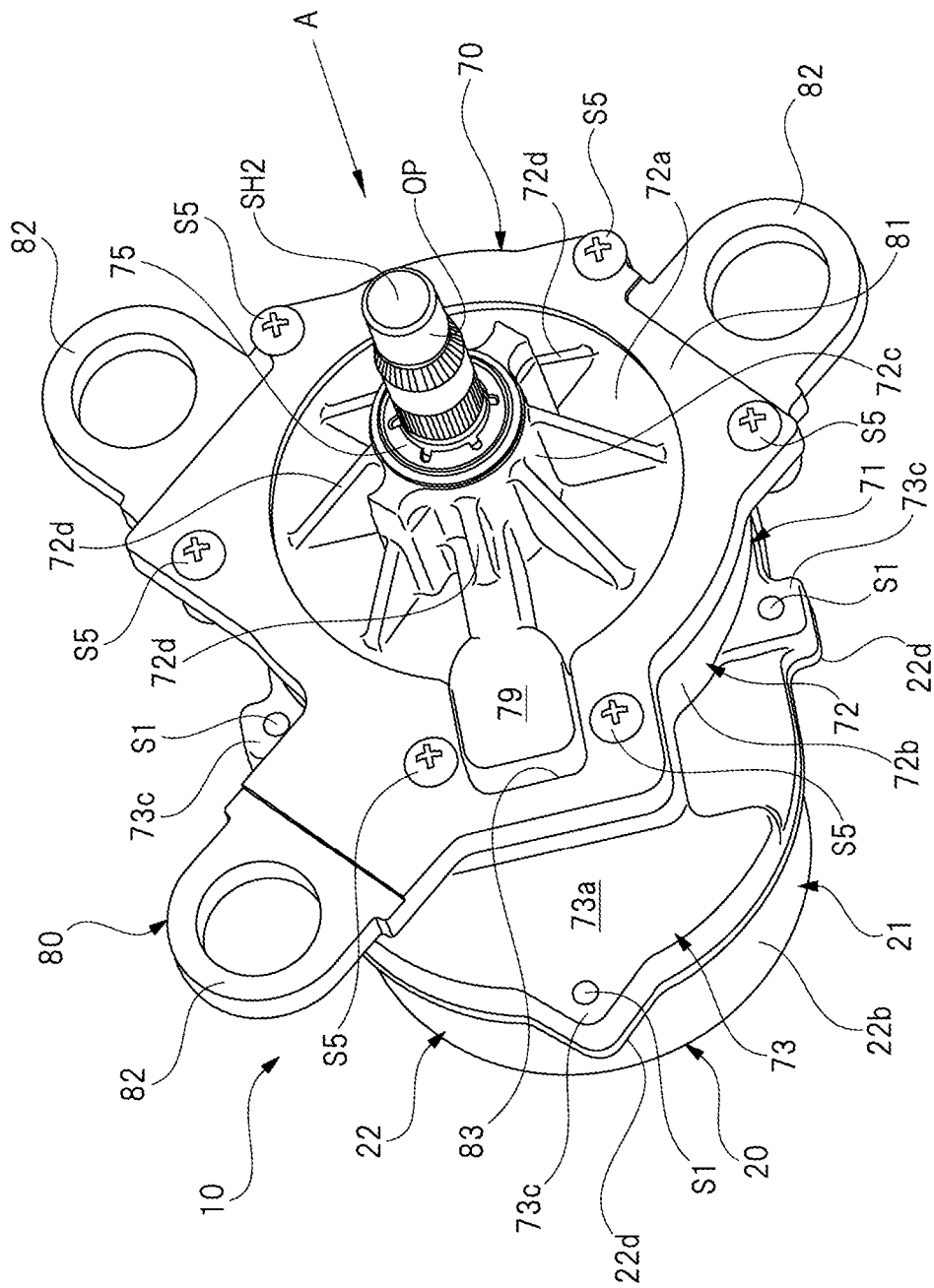
FIG. 1 is a perspective view of a wiper motor as viewed from a gear part side.
Figure 2:
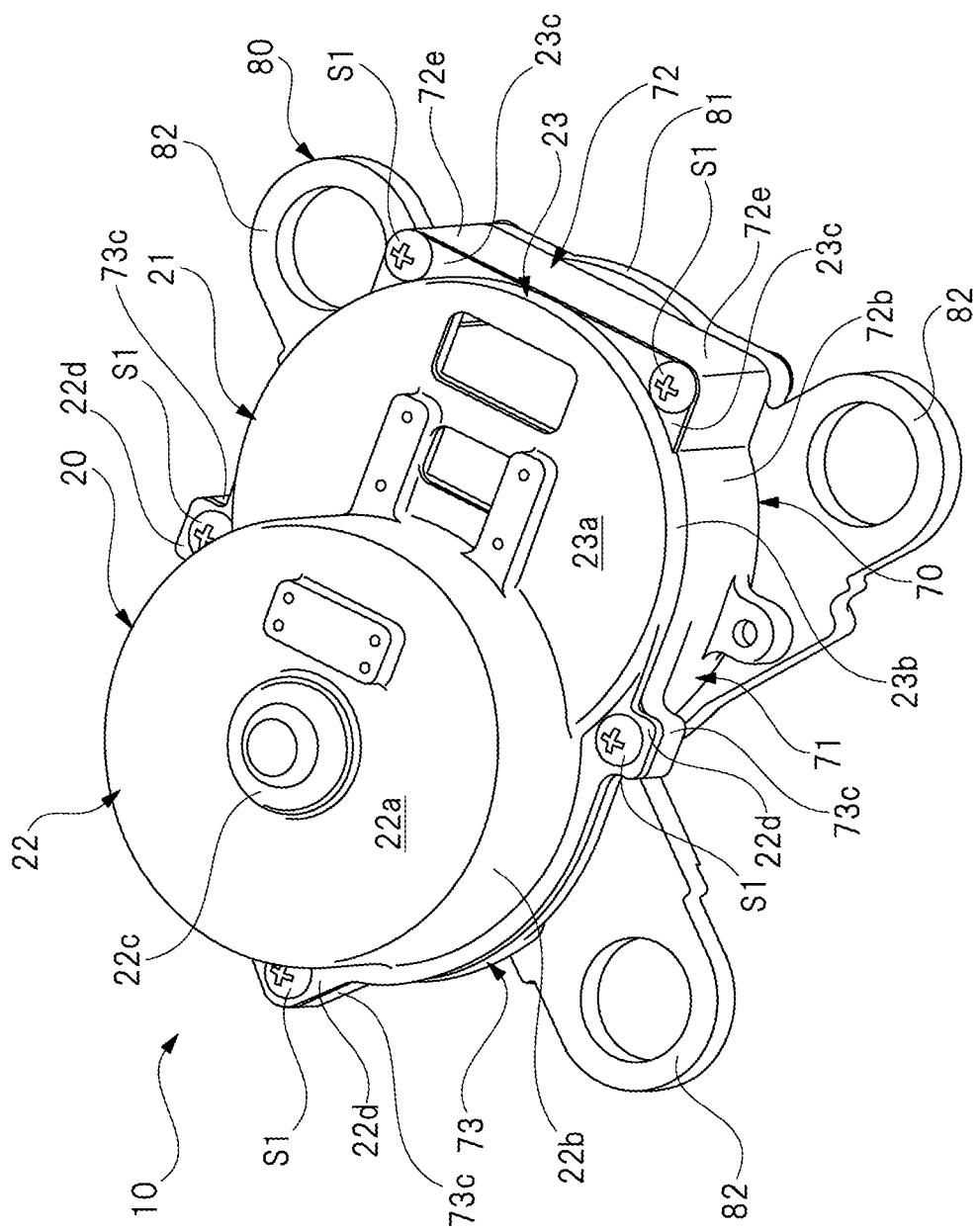
FIG. 2 is a perspective view of the wiper motor as viewed from a motor part side.
Figure 3:
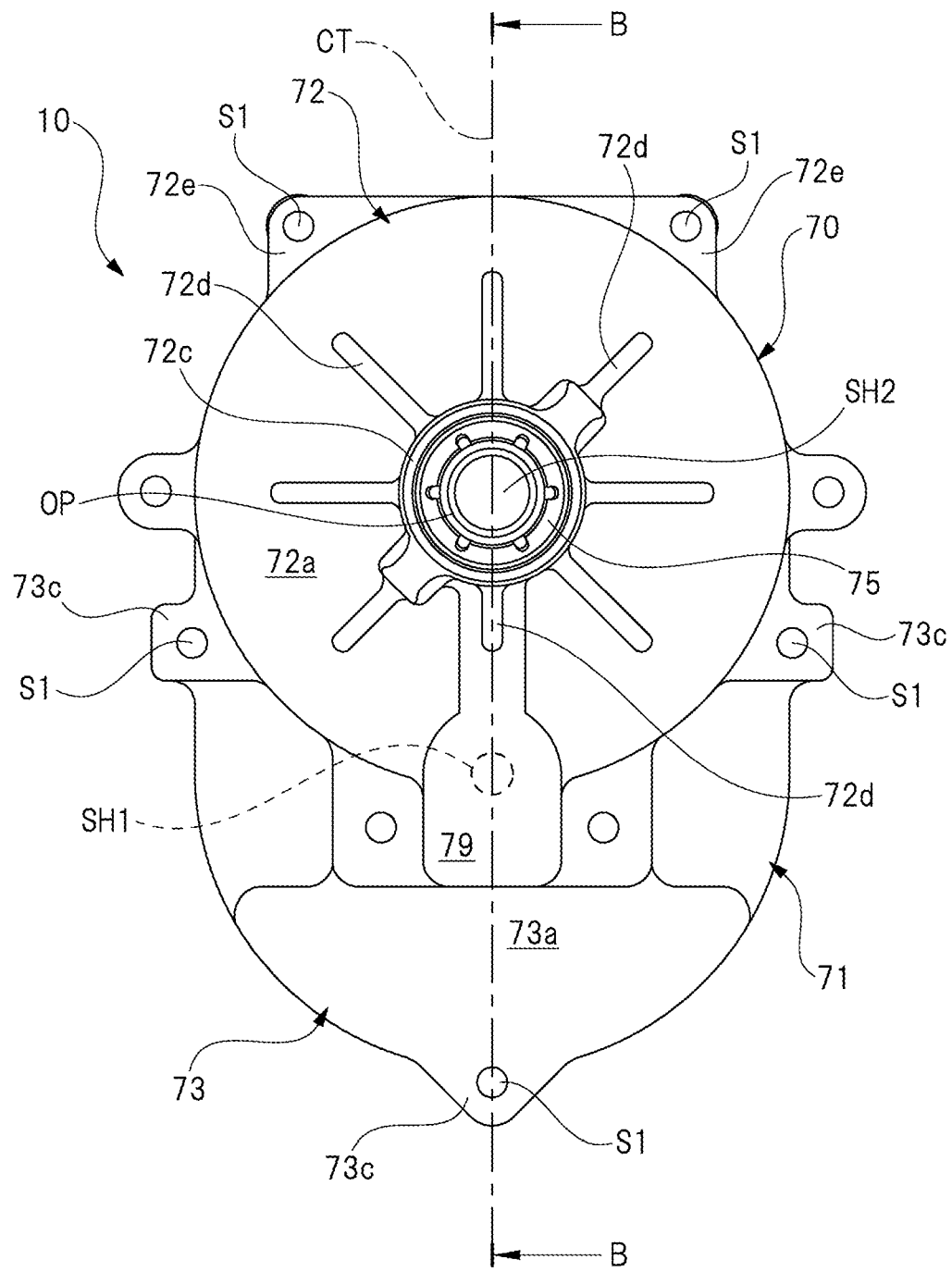
FIG. 3 is a view in a direction of arrow A in FIG. 1 (with the bracket omitted).
Figure 4:
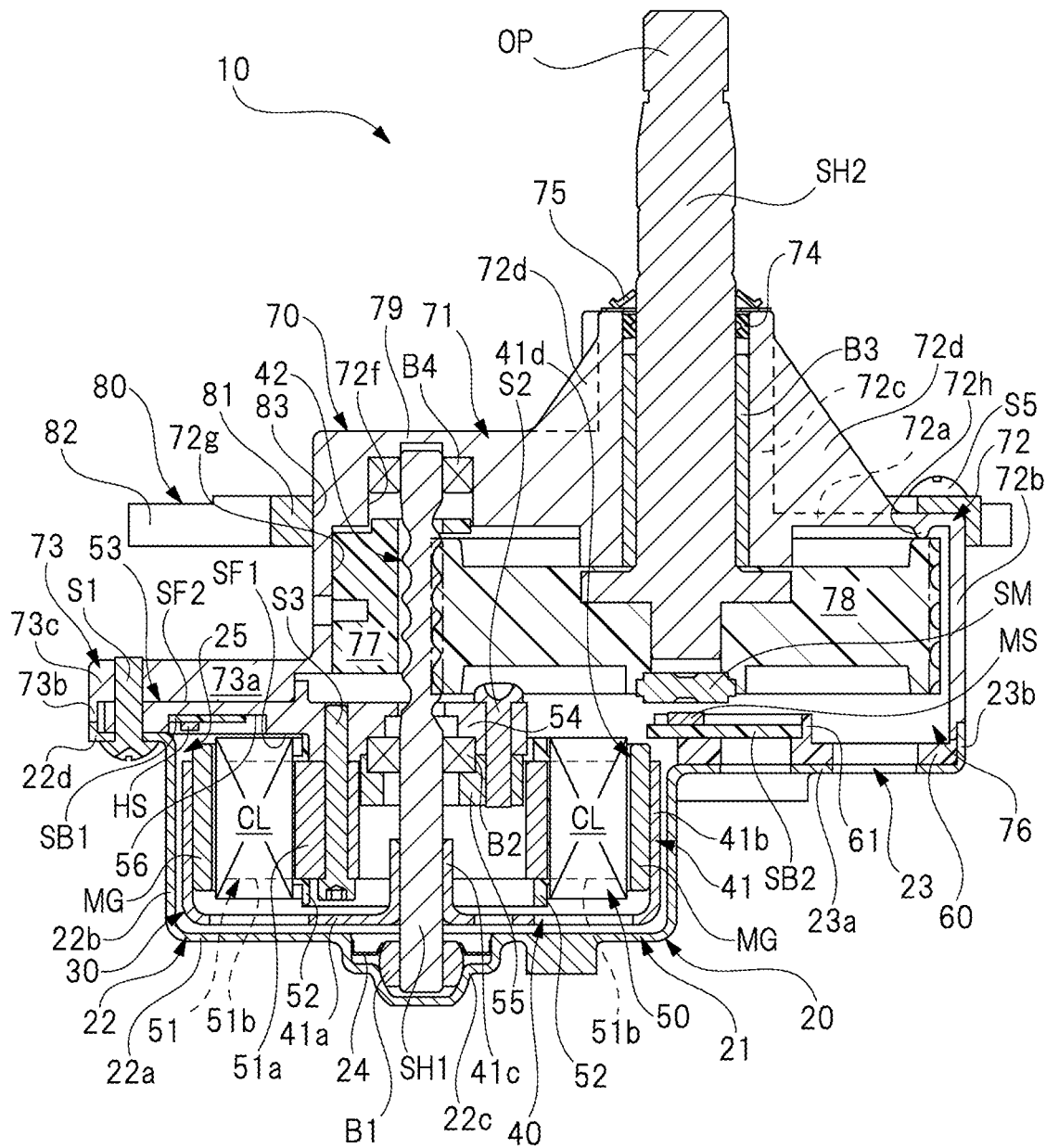
FIG. 4 is a cross-sectional view taken along line B-B of FIG. 3.
Figure 5:
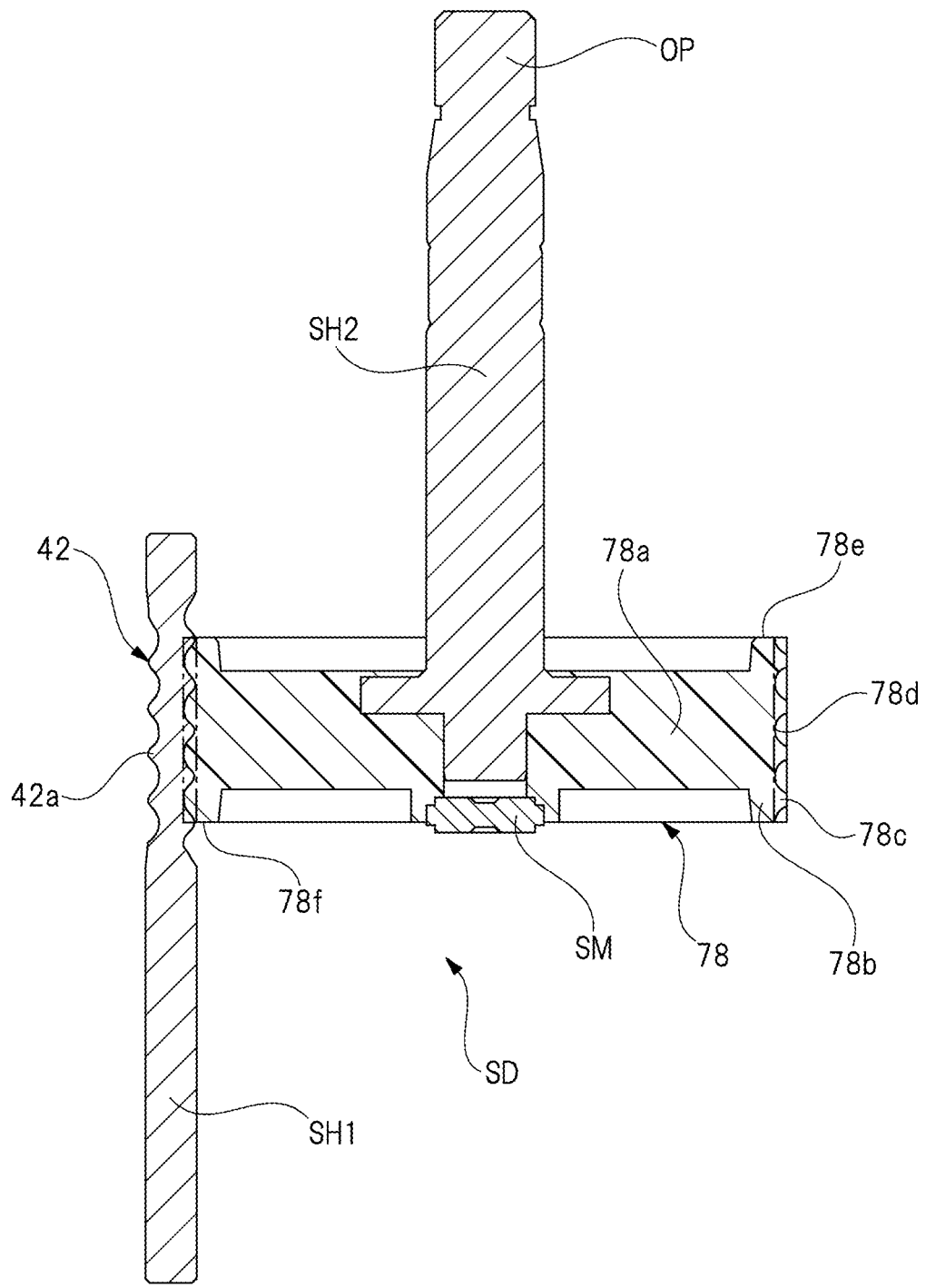
FIG. 5 is a cross-sectional view illustrating only a speed reduction mechanism of FIG. 4.
Figure 6:
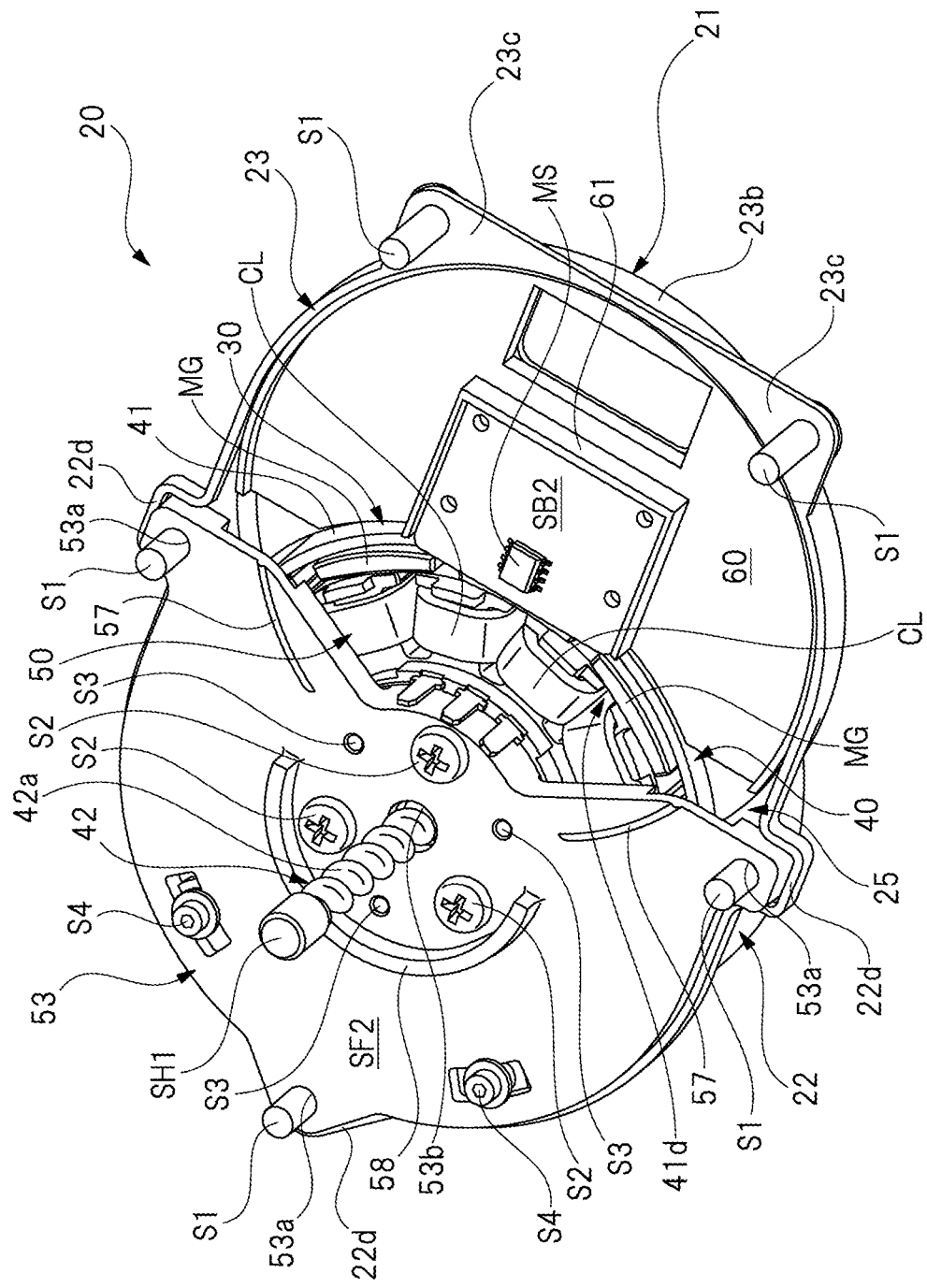
FIG. 6 is an exploded perspective view illustrating the inside of the motor part.
Figure 7:
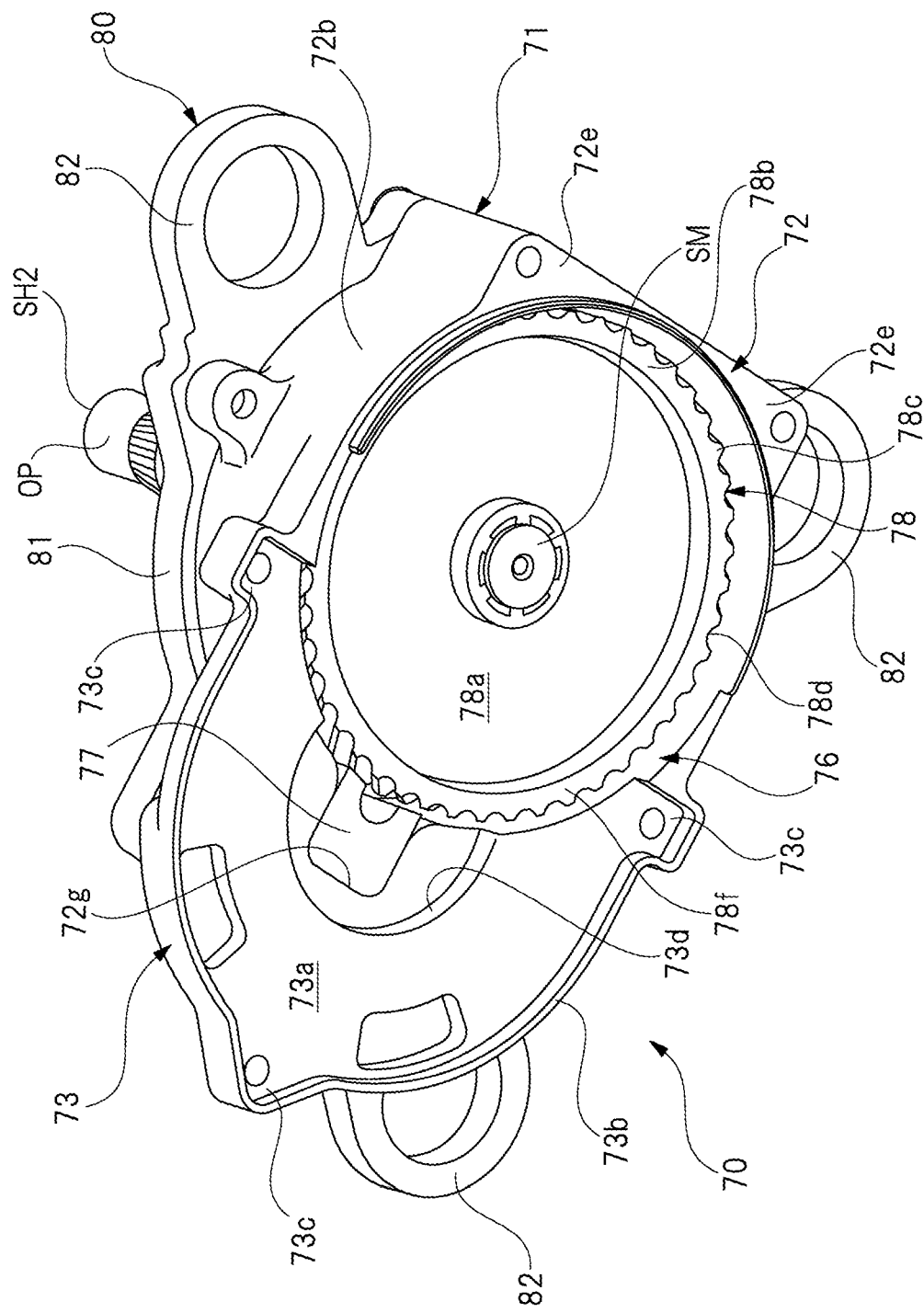
FIG. 7 is an exploded perspective view illustrating the inside of the gear part.

FIG. 1 is a perspective view of a wiper motor as viewed from a gear part side. FIG. 2 is a perspective view of the wiper motor as viewed from a motor part side. FIG. 3 is a view in a direction of arrow Ain FIG. 1 (with the bracket omitted). FIG. 4 is a cross-sectional view taken along line B-B of FIG. 3. FIG. 5 is a cross-sectional view illustrating only a speed reduction mechanism of FIG. 4. FIG. 6 is an exploded perspective view illustrating the inside of the motor part. FIG. 7 is an exploded perspective view illustrating the inside of the gear part.

[Overview of Wiper Motor]

A wiper motor 10 illustrated in FIG. 1 to FIG. 4 is a drive source of a wiper device (not illustrated) mounted on the front of a vehicle such as an automobile. The wiper motor 10 corresponds to a brushless motor in the disclosure, and is mounted in the vicinity of a windshield (not illustrated) of the vehicle. The wiper motor 10 is operated by operation of a wiper switch (not illustrated) provided in the vehicle interior. Accordingly, a wiper member (not illustrated) swingably provided on the windshield performs a reciprocating wiping operation.

Specifically, the wiper motor 10 causes the wiper member provided on each of a driver's seat side and a passenger seat side to reciprocate in a wiping range (not illustrated) between a lower reversing position and an upper reversing position on the windshield. Accordingly, each wiper member wipes off rainwater or the like adhering to the windshield, and a field of vision in front of the vehicle is secured.

The wiper motor 10 includes a motor part 20 and a gear part 70. The motor part 20 and the gear part 70 are firmly fixed to each other by a total of five first fixing screws S1 (see FIG. 2).

As illustrated in FIG. 3, when the wiper motor 10 is viewed in an axial direction of a rotating shaft SH1 and an output shaft SH2, the wiper motor 10 has a line-symmetric shape on the left and right sides in the figure about a line segment CT connecting the rotating shaft SH1 and the output shaft SH2. Accordingly, attachment directionality is eliminated on the left and right sides of the line segment CT, making it possible to easily install the wiper motor 10 on the driver's seat side of a right-hand drive vehicle and on the driver's seat side of a left-hand drive vehicle.

[Motor Part]

As illustrated in FIG. 2 and FIG. 4 to FIG. 6, the motor part 20 includes a motor housing 21 that is formed in a stepped, substantially dish shape by injection molding a molten aluminum material or the like. The motor housing 21 includes a motor accommodation part 22 and a base mounting part 23. The motor accommodation part 22 has a greater depth than the base mounting part 23. Specifically, a depth dimension of the motor accommodation part 22 is approximately five times that of the base mounting part 23.

The motor accommodation part 22 has a first bottom wall 22a formed in a substantially disk shape, and a first side wall 22b extending in the axial direction of the rotating shaft SH1 from an outer edge of the first bottom wall 22a. A small diameter step 22c protruding to the outside (lower side in FIG. 4) of the motor accommodation part 22 is integrally provided in a central portion of the first bottom wall 22a. A first bearing B1 rotatably supporting a base end side (lower side in FIG. 4) of the rotating shaft SH1 is mounted radially inside the small diameter step 22c. The first bearing B1 is retained by a retainer member 24 mounted on the small diameter step 22c.

Furthermore, on a side (upper side in FIG. 4) opposite a side on which the first bottom wall 22a is provided in an axial direction of the first side wall 22b, a total of three first flanges 22d protruding radially outward from the first side wall 22b are integrally provided. The first fixing screws S1 (three out of a total of five) for fixing the motor housing 21 to a gear housing 71 are respectively inserted through the first flanges 22d.

The base mounting part 23 has a second bottom wall 23a formed in a substantially crescent shape, and a second side wall 23b extending in the axial direction of the rotating shaft SH1 from an outer edge of the second bottom wall 23a. A base member 60 that holds a second sensor board SB2 is mounted inside the base mounting part 23. Specifically, the second bottom wall 23a and the second side wall 23b of the base mounting part 23 each hold the base member 60 so that no rattling occurs.

Furthermore, on a side (upper side in FIG. 4) opposite a side on which the second bottom wall 23a is provided in an axial direction of the second side wall 23b, a total of two second flanges 23c protruding radially outward from the second side wall 23b are integrally provided. The first fixing screws S1 (two out of a total of five) for fixing the motor housing 21 to the gear housing 71 are respectively inserted through the second flanges 23c.

Here, the motor housing 21 is provided with a first opening 25 that opens toward the gear housing 71. The first opening 25 corresponds to a motor opening in the disclosure and faces a second opening 76 of the gear housing 71. With the first opening 25 and the second opening 76 butted against each other, the motor housing 21 and the gear housing 71 are firmly fixed to each other by a total of five first fixing screws S1. With the first opening 25 and the second opening 76 butted against each other, the motor housing 21 and the gear housing 71 are arranged side by side in the axial direction of the rotating shaft SH1 (output shaft SH2).

Furthermore, as illustrated in FIG. 6, when viewed in the axial direction of the rotating shaft SH1, the motor accommodation part 22 and the base mounting part 23 partially overlap each other. Accordingly, the motor housing 21 has a substantially daruma shape when viewed in the axial direction of the rotating shaft SH1.

As illustrated in FIG. 4 and FIG. 6, a brushless motor 30 that forms the motor part 20 is accommodated inside the motor accommodation part 22. The brushless motor 30 includes a rotor unit 40 and a stator unit 50.

[Rotor Unit]

The rotor unit 40 includes the rotating shaft SH1 composed of a round steel bar and a rotor body 41 formed in a substantially dish shape. The base end side of the rotating shaft SH1 is rotatably supported by the first bearing B1. A pinion gear 42 is integrally provided on a tip side of the rotating shaft SH1. Here, the pinion gear 42 corresponds to a first gear in the disclosure, and is formed in a helical shape by, for example, knurling.

The rotor body 41 corresponds to a rotor in the disclosure, and rotates the rotating shaft SH1. The rotor body 41 is formed into a substantially U shape in cross section by subjecting a steel plate (magnetic body) to pressing or the like. The rotor body 41 has a rotor bottom wall 41a formed in a substantially disk shape, and a rotor side wall 41b of a cylindrical shape extending in the axial direction of the rotating shaft SH1 from an outer edge of the rotor bottom wall 41a. Here, the rotor bottom wall 41a corresponds to a bottom wall in the disclosure, and the rotor side wall 41b corresponds to a side wall in the disclosure.

Furthermore, a small diameter boss 41c of a cylindrical shape extending in the axial direction of the rotating shaft SH1 is integrally provided in a central portion (rotation center) of the rotor bottom wall 41a. The base end side of the rotating shaft SH1 is firmly fixed to the small diameter boss 41c by press fitting. Accordingly, the base end side of the rotating shaft SH1 is fixed to the rotor bottom wall 41a, and the rotating shaft SH1 is rotated together with the rotor body 41.

A plurality of magnets MG formed in a substantially tile shape (substantially arc shape) are fixed radially inside the rotor side wall 41b. The magnets MG are arranged side by side at equal intervals in a circumferential direction of the rotor body 41 and are firmly fixed to the rotor side wall 41b with an epoxy resin-based adhesive. Accordingly, rotation of the rotor unit 40 does not cause the magnet MG to come off from the rotor body 41.

Here, the rotor body 41 includes, on a side opposite a side on which the rotor bottom wall 41a is provided in the axial direction, a rotor opening 41d that opens toward the gear housing 71. A stator core 51 of the stator unit 50 enters radially inside the rotor side wall 41b (magnet MG) from the rotor opening 41d.

[Stator Unit]

The stator unit 50 includes the stator core 51 formed in a substantially cylindrical shape. The stator core 51 is formed by laminating a plurality of thin steel plates (magnetic bodies), and includes a core body 51a of a substantially cylindrical shape and a plurality of teeth 51b protruding radially outward from the core body 51a. Coils CL corresponding to a U phase, a V phase, and a W phase (three phases) are respectively wound around each tooth 51b with a predetermined number of turns by concentrated winding via an insulator 52 composed of an insulating material such as plastic. The stator core 51 corresponds to a stator in the disclosure.

Here, a drive current is alternately supplied to each of the three-phase coils CL at a predetermined timing from an in-vehicle controller (not illustrated). Accordingly, the rotor unit 40 arranged radially outside the stator core 51 is rotated at a predetermined driving torque in a predetermined rotation direction.

In this way, the wiper motor 10 in the present embodiment adopts an outer rotor type brushless motor. Accordingly, compared to an inner rotor type wiper motor of the same physical size (size), the wiper motor 10 of the outer rotor type in the present embodiment makes it possible to increase the size of the magnet MG. Thus, in the wiper motor 10 of the outer rotor type, reduction in size and increase in output can be realized.

On the other hand, from another point of view, if it is desired to obtain an output equivalent to that of a conventional wiper motor, a relatively large and inexpensive ferrite magnet or the like can be selected as the magnet. Accordingly, the wiper motor 10 of the outer rotor type is favorable in terms of cost reduction.

Furthermore, by setting the wiper motor 10 to be of the outer rotor type, the stator core 51 can be formed into a shape in which the plurality of teeth 51b protrude radially outward. Thus, when the coil CL is wound around each tooth 51b, it is possible to use a general-purpose (general) flyer winding machine, for example, a flyer winding machine used for a brushed motor (basic structure) for winding, which is favorable in terms of manufacturing (ease of assembly).

[Stator Holder]

As illustrated in FIG. 4 and FIG. 6, the stator core 51 is held by a stator holder 53. The stator holder 53 corresponds to a stator bracket in the disclosure. The stator holder 53 is formed in a substantially semicircular dish shape by injection molding a molten aluminum material or the like. The stator holder 53 has a function of accurately positioning the stator core 51 at a prescribed position with respect to the rotor body 41.

The stator holder 53 covers a portion of the first opening 25 that forms the motor housing 21. The stator holder 53 has a first surface SF1 on the motor housing 21 side and a second surface SF2 on the gear housing 71 side.

A bearing holding part 54 is integrally provided in a substantially central portion of the stator holder 53 and on the first surface SF1 side. The bearing holding part 54 holds a second bearing B2. The second bearing B2 rotatably supports an axially central portion of the rotating shaft SH1. The second bearing B2 is sandwiched by the bearing holding part 54 and a bearing fixing member 55. The bearing fixing member 55 is firmly fixed to the bearing holding part 54 by a total of three second fixing screws S2 (see FIG. 4 and FIG. 6). The bearing fixing member 55 is also made of aluminum.

The stator core 51 is fixed on the first surface SF1 side of the stator holder 53. Specifically, the core body 51a of the stator core 51 is fixed on the first surface SF1 side of the stator holder 53 by a total of three third fixing screws S3 (see FIG. 4 and FIG. 6). The rotating shaft SH1 is rotatably arranged radially inside while making no contact with the core body 51a. In this way, the stator core 51 is provided between the rotating shaft SH1 and the magnet MG in a radial direction of the rotor body 41.

Furthermore, a first sensor board fixing part 56 is integrally provided in a portion on the first surface SF1 side of the stator holder 53 and radially outside the bearing holding part 54. The first sensor board fixing part 56 is provided on the first surface SF1 so as to be recessed in the axial direction of the rotating shaft SH1. The first sensor board fixing part 56 is provided with a first sensor board SB1. Specifically, the first sensor board SB1 is fixed to the first sensor board fixing part 56 by a pair of fourth fixing screws S4 (see FIG. 6).

Here, a total of three Hall sensors HS (only one is illustrated in FIG. 4) are mounted on the first sensor board SB1. The Hall sensors HS correspond to a magnetic sensor in the disclosure and correspond to the U phase, the V phase and the W phase, respectively. In this way, the stator holder 53 is provided with three Hall sensors HS, and the Hall sensors HS each face the magnet MG fixed to the rotor side wall 41b in the axial direction of the rotating shaft SH1.

Accordingly, based on a detection signal (rectangular wave signal) from each Hall sensor HS, the in-vehicle controller grasps a rotation state (such as rotation speed or rotation direction) of the rotating shaft SH1 and accurately controls the rotation state of the rotating shaft SH1. In this way, in the wiper motor 10 of the present embodiment, the magnet MG fixed to the rotor body 41 is used in order to detect the rotation state of the rotating shaft SH1. Accordingly, a dedicated sensor magnet for detecting a rotation state of a rotating shaft such as that used conventionally is unnecessary. Thus, while the number of parts of the wiper motor 10 is reduced, further reduction in size and weight may be achieved.

As illustrated in FIG. 6, on the second surface SF2 side of the stator holder 53, a pair of arc-shaped support protrusions 57 slidably supporting a second side surface 78f (see FIG. 7) of a helical gear 78 that forms the gear part 70 are integrally provided. Accordingly, tilting of the helical gear 78 can be suppressed, and the wiper motor 10 can be smoothly operated. Thus, quietness of the wiper motor 10 is improved.

Furthermore, on the second surface SF2 side of the stator holder 53, an arc-shaped engagement protrusion 58 is integrally provided so as to surround the rotating shaft SH1. The arc-shaped engagement protrusion 58 may be fitted to a stator holder positioning recess 73d (see FIG. 7) of the gear housing 71. Accordingly, the stator holder 53 is also accurately positioned at a regular position with respect to the gear housing 71.

Here, as illustrated in FIG. 6, a total of three screw holes 53a are provided in an outer edge portion of the stator holder 53. The first fixing screws 51 (three out of a total of five) for fixing the motor housing 21 to the gear housing 71 are respectively inserted through the screw holes 53a.

A portion of the stator holder 53 where the screw hole 53a is provided is sandwiched between the first flange 22d of the motor housing 21 and a fourth flange 73c of the gear housing 71. That is, the stator holder 53 is sandwiched by the motor housing 21 and the gear housing 71. A pinion hole 53b through which the pinion gear 42 is inserted in a non-contact state is provided in the substantially central portion of the stator holder 53.

[Base Member]

As illustrated in FIG. 4 and FIG. 6, inside the base mounting part 23, the base member 60 formed in a substantially crescent shape of a resin material such as plastic is mounted. A second sensor board fixing part 61 marked off by a substantially rectangular wall is integrally provided in a substantially central portion of the base member 60 and on the gear part 70 side. The second sensor board SB2 is mounted inside the second sensor board fixing part 61. The second sensor board SB2 faces the helical gear 78 in the axial direction of the output shaft SH2.

Here, a single magnetoresistive (MR) sensor MS is mounted on the second sensor board SB2. The MR sensor MS faces a sensor magnet SM fixed to a rotation center of the helical gear 78 in the axial direction of the output shaft SH2. Accordingly, based on a detection signal (rectangular wave signal) from the MR sensor MS, the in-vehicle controller grasps a rotation state (such as rotation position) of the output shaft SH2 and accurately controls a wiping position of the wiper member with respect to the windshield.

An external connector (not illustrated) on the vehicle side is able to be electrically connected to each of the three-phase coils CL wound around the stator core 51, or the first sensor board SB1 and the second sensor board SB2, via a connector connecting part (not illustrated). Accordingly, the in-vehicle controller is able to accurately drive the motor part 20 according to a detection signal from the first sensor board SB1 and the second sensor board SB2.

[Gear Part]

As illustrated in FIG. 1, FIG. 3, FIG. 4 and FIG. 7, the gear part 70 includes the gear housing 71 that is formed in a stepped, substantially dish shape by injection molding a molten aluminum material or the like. The gear housing 71 includes a helical gear accommodation part 72 and a stator holder cover 73. The helical gear accommodation part 72 has a greater depth than the stator holder cover 73. Specifically, a depth dimension of the helical gear accommodation part 72 is approximately seven times that of the stator holder cover 73.

The helical gear accommodation part 72 rotatably accommodates the helical gear 78. The helical gear accommodation part 72 has a third bottom wall 72a formed in a substantially disk shape, and a third side wall 72b extending in the axial direction of the output shaft SH2 from an outer edge of the third bottom wall 72a. A large diameter boss 72c protruding to the outside (upper side in FIG. 4) of the helical gear accommodation part 72 is integrally provided in a central portion of the third bottom wall 72a. A third bearing B3 of a cylindrical shape rotatably supporting the output shaft SH2 is mounted radially inside the large diameter boss 72c. Accordingly, the output shaft SH2 is rotatably supported in a smooth manner without rattling by the large diameter boss 72c that forms the gear housing 71.

An O-ring 74 made of an elastic material such as rubber is mounted radially inside the large diameter boss 72c and on a tip side (upper side in FIG. 4) of the large diameter boss 72c. Accordingly, rainwater or dust or the like is prevented from entering between the output shaft SH2 and the third bearing B3.

Furthermore, a plurality of reinforcement ribs 72d formed in a substantially triangular shape are integrally provided in a portion outside the gear housing 71 and radially outside the large diameter boss 72c. The reinforcement ribs 72d increase a fixing strength of the large diameter boss 72c with respect to the third bottom wall 72a. Eight reinforcement ribs 72d are arranged so as to be equally spaced (at intervals of 45 degrees) in a circumferential direction of the large diameter boss 72c.

Here, a retaining ring 75 is fixed to an axially central portion of the output shaft SH2. The retaining ring 75 is hooked to a tip portion of the large diameter boss 72c. Accordingly, the large diameter boss 72c is sandwiched between the helical gear 78 and the retaining ring 75, and the output shaft SH2 is retained with respect to the large diameter boss 72c. Thus, rattling of the output shaft SH2 with respect to the large diameter boss 72c is suppressed, thus ensuring quietness of the wiper motor 10.

A total of two third flanges 72e protruding radially outward from the third side wall 72b are integrally provided in the outer edge portion of the third side wall 72b. The first fixing screws S1 (two out of a total of five) for fixing the motor housing 21 to the gear housing 71 are respectively screwed to the third flanges 72e.

Furthermore, the stator holder cover 73 has a fourth bottom wall 73a formed in a substantially crescent shape and a fourth side wall 73b extending in the axial direction of the output shaft SH2 from an outer edge of the fourth bottom wall 73a. The stator holder cover 73 is a portion that covers the stator holder 53 (see FIG. 6) provided in the motor part 20.

A total of three fourth flanges 73c protruding radially outward from the fourth bottom wall 73a are integrally provided in the outer edge portion of the fourth bottom wall 73a. The first fixing screws S1 (three out of a total of five) for fixing the motor housing 21 to the gear housing 71 are respectively screwed to the fourth flanges 73c.

Here, the gear housing 71 is provided with the second opening 76 that opens toward the motor housing 21. The second opening 76 faces the first opening 25 of the motor housing 21 (see FIG. 4). As illustrated in FIG. 7, when viewed in the axial direction of the output shaft SH2, the helical gear accommodation part 72 and the stator holder cover 73 partially overlap each other. Accordingly, the gear housing 71 has a substantially daruma shape when viewed in the axial direction of the output shaft SH2.

As illustrated in FIG. 4, a bearing member accommodation part 72f is provided in a position eccentric from the large diameter boss 72c of the third bottom wall 72a. The bearing member accommodation part 72f is formed in a substantially cylindrical shape on its radially inside, and is recessed toward a tip side (upper side in FIG. 4) of the output shaft SH2 inside the gear housing 71. A fourth bearing B4 rotatably supporting the tip side of the rotating shaft SH1 is accommodated inside the bearing member accommodation part 72f.

In this way, the large diameter boss 72c supporting the output shaft SH2 and the fourth bearing B4 supporting the rotating shaft SH1 are each provided in the gear housing 71 made of aluminum and formed with precision. Accordingly, the output shaft SH2 and the rotating shaft SH1 can be accurately arranged with respect to each other, and the pinion gear 42 and the helical gear 78 can be accurately meshed with each other inside the gear housing 71. Thus, it is possible to further improve quietness of the wiper motor 10.

In particular, both axial sides of the pinion gear 42 are rotatably supported by the second bearing B2 and the fourth bearing B4. Accordingly, deformation such as warping of the pinion gear 42 is suppressed. Thus, disengagement of the pinion gear 42 and the helical gear 78 from each other is effectively prevented.

A backup member accommodation part 72g is provided in a portion of the third bottom wall 72a near the stator holder cover 73. The backup member accommodation part 72g is arranged in the vicinity of the bearing member accommodation part 72f. A backup member 77 is accommodated inside the backup member accommodation part 72g.

Here, the backup member 77 is made of a resin material such as plastic, and is fixed inside the backup member accommodation part 72g. The backup member 77 is arranged around the pinion gear 42 so as to surround the pinion gear 42 with a small gap therebetween. Accordingly, the backup member 77 prevents the pinion gear 42 from bending when a large external force is applied to the output shaft SH2. This also prevents disengagement of the pinion gear 42 and the helical gear 78 from each other.

Furthermore, a support protrusion 72h formed in a substantially annular shape is provided inside the third bottom wall 72*a*. The support protrusion 72*h* protrudes at a predetermined height toward the inside (lower side in FIG. 4) of the gear housing 71. The support protrusion 72*h* prevents the helical gear 78 from tilting when a large external force is applied to the output shaft SH2. Thus, tilting of the helical gear 78 inside the gear housing 71 is suppressed, which also keeps the pinion gear 42 and the helical gear 78 meshed with each other. Specifically, the support protrusion 72*h* slidably supports a first side surface 78*e* (see FIG. 5) of the helical gear 78. This also enables the wiper motor 10 to smoothly operate, thus improving quietness of the wiper motor 10.

As illustrated in FIG. 7, the fourth bottom wall 73*a* is provided with the stator holder positioning recess 73*d*. The stator holder positioning recess 73*d* is provided so as to surround the backup member accommodation part 72*g*, and is recessed toward the backup member accommodation part 72*g*. The arc-shaped engagement protrusion 58 (see FIG. 6) of the stator holder 53 may be fitted to the stator holder positioning recess 73*d*.

[Bracket]

As illustrated in FIG. 1 and FIG. 2, a bracket 80 for fixing the wiper motor 10 to the vehicle is fixed to the third bottom wall 72*a* of the gear housing 71. The bracket 80 is formed into a plate shape by subjecting a thick steel plate to punching or the like. Specifically, the bracket 80 includes a bracket body 81 of an annular shape fixed to the gear housing 71 and a total of three attachment legs 82 integrally provided on an outer edge of the bracket body 81.

A notch 83 cut out in a substantially rectangular shape is provided radially inside the bracket body 81. The notch 83 is engaged with a rotating shaft support 79 provided in the gear housing 71. Here, the rotating shaft support 79 is arranged in a place where the bearing member accommodation part 72*f* (see FIG. 4) is provided, and is formed in a substantially rectangular parallelepiped shape. Accordingly, when the bracket 80 is assembled to the gear housing 71, rotation of the bracket 80 with respect to the gear housing 71 is prevented, thus accurately positioning the bracket 80 with respect to the gear housing 71 (improving assemblability).

The bracket body 81 is firmly fixed to the third bottom wall 72*a* by a total of six fifth fixing screws S5. A rubber bush (not illustrated) is mounted on each attachment leg 82, and each rubber bush is fixed to the vehicle by a fixing bolt (not illustrated). Accordingly, vibration generated when the wiper motor 10 operates is less likely to be transmitted to the vehicle, and vibration on the vehicle side is also less likely to be transmitted to the wiper motor 10.

Here, an attachment posture of the bracket 80 with respect to the gear housing 71 illustrated in FIG. 1 and FIG. 2 is, for example, an attachment posture for a right-hand drive vehicle. In other words, the wiper motor 10 to which the bracket 80 is attached in the posture illustrated in FIG. 1 and FIG. 2 serves as the wiper motor 10 for a right-hand drive vehicle.

Here, in the wiper motor 10 of the present embodiment, it is also possible to turn over the bracket 80 and attach it to the gear housing 71. That is, the attachment posture of the bracket 80 with respect to the gear housing 71 can be set for a right-hand drive vehicle or a left-hand drive vehicle. In this way, in the wiper motor 10 of the present embodiment, it is possible to select the front or back of the bracket 80 and fix it to the third bottom wall 72*a*, and a single wiper motor 10 can be used for either a right-hand drive vehicle or a left-hand drive vehicle.

[Speed Reduction Mechanism]

As illustrated in FIG. 4 and FIG. 5, a speed reduction mechanism SD that forms the gear part 70 is rotatably accommodated inside the gear housing 71. The speed reduction mechanism SD includes the pinion gear 42 provided integrally with the rotating shaft SH1, and the helical gear 78 meshed with the pinion gear 42 and rotated at a lower speed than the pinion gear 42. Here, the helical gear 78 corresponds to a second gear in the disclosure.

An axis of the pinion gear 42 and an axis of the helical gear 78 are parallel to each other. That is, the rotating shaft SH1 and the output shaft SH2 are parallel to each other. Accordingly, the speed reduction mechanism SD may be made more compact in physical size than a worm speed reducer including a worm and a worm wheel whose axes intersect each other.

The pinion gear 42 is arranged on the rotating shaft SH1 side (input side) of the wiper motor 10, and the helical gear 78 is arranged on the output shaft SH2 side (output side) of the wiper motor 10. That is, the speed reduction mechanism SD may reduce high speed rotation of the pinion gear 42 having a small number of teeth to low speed rotation of the helical gear 78 having a large number of teeth. Thus, the helical gear 78 is rotated at a lower speed than the pinion gear 42.

As illustrated in FIG. 5 and FIG. 6, a helical tooth (tooth) 42*a* is integrally provided around the pinion gear 42. An axial length of the helical tooth 42*a* is slightly longer than an axial length of the helical gear 78. Accordingly, the helical tooth 42*a* is securely meshed with the helical gear 78.

The helical tooth 42*a* extends in a helically connected manner in the axial direction of the pinion gear 42. The pinion gear 42 is provided with only one helical tooth 42*a*. That is, the number of teeth of the pinion gear 42 is "1". The helical tooth 42*a* is formed to have a circular shape in cross section, and may enter (mesh) with a meshing recess 78*d* of the helical gear 78. In this way, by setting the number of teeth of the pinion gear 42 to "1", transmission efficiency of the gear is improved, thereby reducing power consumption of the motor part 20.

The helical gear 78 that forms the speed reduction mechanism SD is made of a resin material such as plastic. As illustrated in FIG. 5 and FIG. 7, the helical gear 78 includes a gear body 78*a* formed in a substantially disk shape. The helical gear 78 is firmly fixed so that a rotation center of the output shaft SH2 coincides with a rotation center of the gear body 78*a*. Accordingly, the output shaft SH2 is rotated together with the helical gear 78. The sensor magnet SM is fixed to the rotation center of the gear body 78*a* and on the second sensor board SB2 side (lower side in FIG. 5).

Here, the output shaft SH2 is formed with a step by subjecting a round steel bar to cutting or the like, and an output part OP to which a link mechanism or the like (not illustrated) that forms the wiper member is fixed is integrally provided on a tip side in the axial direction of the output shaft SH2. Specifically, the output part OP is a male screw (not illustrated in detail). A nut (not illustrated) for fixing the link mechanism or the like is screwed to the output part OP.

A gear formation part 78*b* formed in a substantially cylindrical shape is provided radially outside the gear body 78*a*. The gear formation part 78*b* is provided with a plurality of oblique teeth 78*c* arranged side by side in a circumferential direction of the gear formation part 78*b*. The oblique teeth 78*c* tilt at a predetermined angle with respect to the axial direction of the helical gear 78. Accordingly, the helical gear 78 is rotated as the helical tooth 42*a* rotates. Specifically, the meshing recess 78*d* is provided between adjacent oblique teeth 78*c*, and the helical tooth 42*a* enters and is meshed with the meshing recess 78*d*. The meshing recess 78*d* is also formed to have a circular shape in cross section.

The first side surface 78e and the second side surface 78f are respectively provided on both axial sides of the gear formation part 78b. In the axial direction of the output shaft SH2, the first side surface 78e faces the support protrusion 72h (see FIG. 4) of the helical gear accommodation part 72. In the axial direction of the output shaft SH2, the second side surface 78f faces the pair of arc-shaped support protrusions 57 (see FIG. 6) of the stator holder 53. Accordingly, the helical gear 78 is prevented from tilting when a large external force is applied to the output shaft SH2.

Here, the number of oblique teeth 78c (meshing recesses 78d) provided in the helical gear 78 is "45". In the present embodiment, the speed reduction mechanism SD including the pinion gear 42 and the helical gear 78 has a speed reduction ratio of "45". That is, by making 45 rotations of the pinion gear 42, one rotation of the helical gear 78 is finally made. In this way, compared to a conventional worm speed reducer, the physical size can be made compact, and a large reduction ratio can be achieved. However, the number of oblique teeth 78c (meshing recesses 78d) provided in the helical gear 78 is not limited to "45" as described above, and may be set to, for example, "40", or any other number, in accordance with specifications of the speed reduction mechanism SD.

As described in detail above, according to the present embodiment, since the rotating shaft SH1 and the output shaft SH2 are parallel to each other, as illustrated in FIG. 4, the motor housing 21 and the gear housing 71 can be arranged side by side in the axial direction of the rotating shaft SH1 (output shaft SH2). Accordingly, the wiper motor 10 can be given a line-symmetric shape in appearance about the line segment CT connecting the rotating shaft SH1 and the output shaft SH2. Accordingly, attachment directionality can be eliminated on the left and right sides of the line segment CT connecting the rotating shaft SH1 and the output shaft SH2. Thus, it is possible to improve layout properties.

According to the present embodiment, the rotor body 41 includes, on the side opposite the side on which the rotor bottom wall 41a is provided in the axial direction, the rotor opening 41d that opens toward the gear housing 71. Accordingly, the stator core 51 that forms the stator unit 50 can be arranged radially inside the rotor side wall 41b from the rotor opening 41d. Thus, it is possible to reduce a dimension of the wiper motor 10 in the axial direction of the rotating shaft SH1. Furthermore, the magnet MG fixed radially inside the rotor side wall 41b and the Hall sensor HS supported by the stator holder 53 can be made to face each other without anything interposed therebetween. Accordingly, it is possible to improve detection accuracy of the Hall sensor HS.

According to the present embodiment, the motor housing 21 has the first opening 25 that opens toward the gear housing 71. At least a portion of the first opening 25 is covered by the stator holder 53 that holds the stator core 51. The stator holder 53 is provided with the Hall sensor HS facing the magnet MG in the axial direction of the rotating shaft SH1. In this way, since both the stator core 51 and the Hall sensor HS are provided in the stator holder 53, it is possible to improve positional accuracy of both while improving assemblability. Thus, detection accuracy of the Hall sensor HS can also be improved. Furthermore, a sensor magnet dedicated to rotation detection is unnecessary, the number of parts of the wiper motor 10 can be reduced, and further reduction in size and weight may be achieved.

According to the present embodiment, since the stator holder 53 is sandwiched by the motor housing 21 and the gear housing 71, the stator holder 53 can be fixed simply by being sandwiched. Accordingly, there is no need to separately provide a fixing structure for fixing the stator holder 53, and it is possible to improve assemblability of the wiper motor 10.

Furthermore, according to the present embodiment, since the speed reduction mechanism SD is formed of the pinion gear 42 having one helical tooth 42a connected in a helical manner and the helical gear 78 having the oblique tooth 78c with which the one helical tooth 42a is meshed, it is possible to improve transmission efficiency of the gear, and power consumption of the motor part 20 can be reduced. Compared to a worm speed reducer, it is possible to increase the speed reduction ratio while reducing the physical size.

Furthermore, according to the present embodiment, since common use of the wiper motor 10 in a right-hand drive vehicle and a left-hand drive vehicle is made possible, the need for separate manufacture for right-hand use and for left-hand use is eliminated, and the number of parts can also be reduced, energy for manufacturing the wiper motor 10 can be reduced. Thus, in the Sustainable Development Goals (SDGs) defined by the United Nations, Goal 7 ("ensure access to affordable, reliable, sustainable and modern energy for all") and Goal 13 ("take urgent action to combat climate change and its impacts"), in particular, can be achieved.

It goes without saying that the disclosure is not limited to the above embodiments but can be modified in various ways without departing from the gist thereof. For example, the above embodiment illustrates that the brushless motor is applied to the drive source (wiper motor 10) of the wiper device mounted on the vehicle. However, the disclosure is not limited thereto. The brushless motor can be applied to another drive source of a device such as a power window device or a sunroof device.

In the above embodiment, the gear part 70 and the bracket 80 including the attachment leg 82 are illustrated as being separate components. However, the disclosure is not limited thereto. While the bracket 80 is omitted, an attachment leg may be provided integrally with the gear housing 71 that forms the gear part 70.

The material, shape, dimension, number, installation place and the like of each component in the above embodiment are arbitrary if the disclosure can be achieved, and are not limited to the above embodiment.

What is claimed is:

1. A brushless motor comprising:
a motor part; and
a gear part, wherein
the motor part comprises:
a rotating shaft, having a first gear provided on a tip side thereof;
a rotor, having a bottom wall and a side wall, the bottom wall being fixed to a base end side of the rotating shaft;
a plurality of magnets, fixed to the side wall and arranged side by side in a circumferential direction of the rotor;
a stator, provided between the rotating shaft and the plurality of magnets in a radial direction of the rotor and wound with a coil; and
a motor housing, rotatably supporting the rotating shaft, and accommodating the rotor and the stator;
the gear part comprises:
a second gear, meshed with the first gear;
an output shaft, having an output part provided on a tip side thereof, having a base end side thereof fixed to the second gear, and parallel to the rotating shaft; and
a gear housing, rotatably supporting the output shaft, and accommodating the second gear, a bearing, rotatably supporting the rotating shaft at a location more toward the tip side of the rotating shaft than the first gear, the bearing is accommodated inside the gear housing, wherein the first gear is a pinion gear having one spiral tooth; and the second gear is a helical gear having an oblique tooth with which the one spiral tooth is meshed, wherein a backup member is disposed adjacent to the first gear, and the backup member is arranged to partially surround the first gear, wherein the backup member is separate from the gear housing, wherein in an axial direction of the rotating shaft, at least a part of the bearing and a part of the backup member overlap.

2. The brushless motor according to claim 1, wherein the rotor comprises a rotor opening that opens toward the gear housing.

3. The brushless motor according to claim 2, wherein the motor housing comprises a motor opening that opens toward the gear housing;

at least a portion of the motor opening is covered by a stator bracket that holds the stator; and the stator bracket is provided with a magnetic sensor facing the plurality of magnets in an axial direction of the rotating shaft.

4. The brushless motor according to claim 3, wherein the stator bracket is sandwiched by the motor housing and the gear housing.

5. The brushless motor according to claim 1, wherein the motor housing comprises a motor opening that opens toward the gear housing;

at least a portion of the motor opening is covered by a stator bracket that holds the stator; and the stator bracket is provided with a magnetic sensor facing the plurality of magnets in an axial direction of the rotating shaft.

6. The brushless motor according to claim 5, wherein the stator bracket is sandwiched by the motor housing and the gear housing.

7. The brushless motor according to claim 5, wherein the bearing is a first bearing, a second bearing, rotatably supporting a base end side of the rotating shaft is accommodated in the motor housing, a third bearing, rotatably supporting an axially central portion of the rotating shaft.

8. The brushless motor according to claim 1, wherein the bearing is accommodated inside a bearing member accommodation part of the gear housing, an output shaft bearing, rotatably supporting the output shaft is accommodated in an output shaft accommodation part of the gear housing, the backup member is accommodated inside a backup member accommodation part of the gear housing, the bearing member accommodation part, the output shaft accommodation part, and the backup member accommodation part are integrally provided in the gear housing.

9. The brushless motor according to claim 1, wherein the backup member is made of a resin material.

10. The brushless motor according to claim 1, wherein a surface of the backup member abuts the gear housing in a direction from the output shaft towards the rotating shaft.

* * * * *